United States Patent
Diab

(10) Patent No.: US 8,261,114 B2
(45) Date of Patent: Sep. 4, 2012

(54) SYSTEM AND METHOD FOR DYNAMIC ENERGY EFFICIENT ETHERNET CONTROL POLICY BASED ON USER OR DEVICE PROFILES AND USAGE PARAMETERS

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 572 days.

(21) Appl. No.: 12/468,024

(22) Filed: May 18, 2009

(65) Prior Publication Data
US 2010/0293404 A1 Nov. 18, 2010

(51) Int. Cl.
G06F 1/26 (2006.01)
G06F 1/00 (2006.01)

(52) U.S. Cl. ........ 713/320; 713/300; 713/310; 713/324; 709/221; 370/311; 370/329

(58) Field of Classification Search .................. 713/300, 713/310, 320, 324; 709/221
See application file for complete search history.

(56) References Cited

U.S. PATENT DOCUMENTS

| | | | |
|---|---|---|---|
| 7,155,622 B2* | 12/2006 | Mancey et al. | 713/324 |
| 7,472,290 B2* | 12/2008 | Diab et al. | 713/300 |
| 7,793,126 B2* | 9/2010 | McGrane et al. | 713/320 |
| 7,861,099 B2* | 12/2010 | Theocharous et al. | 713/300 |
| 7,870,401 B2* | 1/2011 | Diab et al. | 713/300 |
| 7,903,597 B2* | 3/2011 | Biederman et al. | 370/311 |
| 7,916,676 B2* | 3/2011 | Elzur et al. | 370/311 |
| 8,094,550 B2* | 1/2012 | Winter | 370/229 |
| 2006/0143583 A1* | 6/2006 | Diab et al. | 716/4 |
| 2007/0110360 A1* | 5/2007 | Stanford | 385/14 |
| 2008/0232290 A1* | 9/2008 | Elzur et al. | 370/311 |
| 2009/0049315 A1* | 2/2009 | Diab et al. | 713/310 |
| 2009/0077395 A1* | 3/2009 | Tsai | 713/310 |
| 2009/0100275 A1* | 4/2009 | Chang et al. | 713/300 |
| 2009/0119524 A1* | 5/2009 | Hays | 713/322 |
| 2009/0157865 A1* | 6/2009 | Winter | 709/224 |
| 2009/0225773 A1* | 9/2009 | Winter | 370/437 |
| 2010/0083022 A1* | 4/2010 | Diab | 713/340 |
| 2011/0080919 A1* | 4/2011 | Ding et al. | 370/419 |

OTHER PUBLICATIONS

IEEE Transactions on Computers, vol. 57, No. 4,—"Reducing the Energy Consumption of Ethernet with Adaptive Link Rate (ALR)"; Dated Apr. 2008, 14 pages.*
IEEE 802 Tutorial—"Energy Efficient Ethernet"; Dated Jul. 16, 2007, 72 pages.*
IEEE ICC 2007 Proceedings—"Dynamic Ethernet Link Shutdown for Energy Conservation on Ethernet Links" bu Maruti Gupta and Suresh Singh; Dated 2007, 6 pages.*

* cited by examiner

Primary Examiner — Brian Misiura
(74) Attorney, Agent, or Firm — Duane S. Kobayashi

(57) ABSTRACT

A system and method for dynamic energy efficient Ethernet (EEE) control policy based on user or device profiles and usage parameters. The analysis by an EEE control policy can consider user or device related EEE profile information that is either network propagated or retrieved from a network database. This EEE profile information can be used in combination with static settings established by an IT manager and the properties of the traffic on the link itself.

11 Claims, 5 Drawing Sheets

SYSTEM AND METHOD FOR DYNAMIC ENERGY EFFICIENT ETHERNET CONTROL POLICY BASED ON USER OR DEVICE PROFILES AND USAGE PARAMETERS

BACKGROUND

1. Field of the Invention

The present invention relates generally to energy efficient Ethernet (EEE) and, more particularly, to a system and method for dynamic EEE control policy based on user or device profiles and usage parameters.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the utilization of the network link. For example, many network links are typically in an idle state between sporadic bursts of data, while in other network links, there can be regular or intermittent low-bandwidth traffic, with bursts of high-bandwidth traffic.

Conventionally, an EEE control policy can analyze the link utilization to determine whether to adapt the link, link rate, and layers above the link to an optimal solution based on various energy costs and impact on traffic. While this level of analysis provides a coarse mechanism of intelligently saving energy, it falls short of the ideal. What is needed therefore is a mechanism that improves the ability of the EEE control policy to tailor an energy saving solution to the particular performance characteristics of a link.

SUMMARY

A system and/or method for dynamic EEE control policy based on user or device profiles and usage parameters, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Energy Efficient Ethernet (EEE) networks attempt to save power when the traffic utilization of the network is not at its maximum capacity. This serves to minimize the performance impact while maximizing energy savings. At a broad level, the EEE control policy for a particular link in the network determines when to enter an energy saving state, what energy saving state (i.e., level of energy savings) to enter, how long to remain in that energy saving state, what energy saving state to transition to out of the previous energy saving state, etc. Conventional EEE control policies can base these decisions on a combination of static settings established by an IT manager and the properties of the traffic on the link itself.

Figure 1:
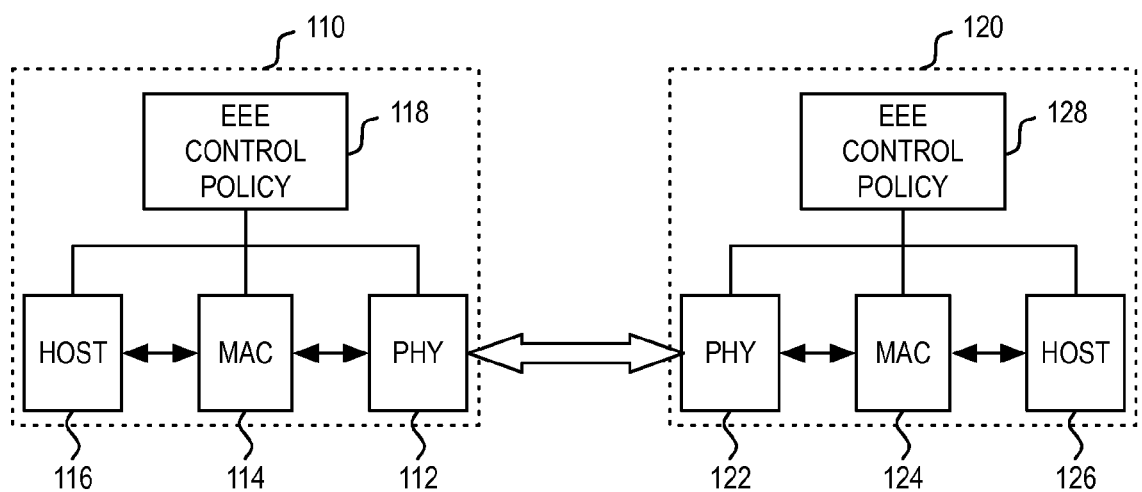
FIG. 1 illustrates an Ethernet link between a local and remote link partner.

FIG. 1 illustrates an example link to which an EEE control policy can be applied. As illustrated, the link supports communication between a first link partner 110 and a second link partner 120. In various embodiments, link partners 110 and 120 can represent a switch, router, endpoint (e.g., server, client, VOIP phone, wireless access point, etc.), or the like. As would be appreciated, the link can operate at standard or non-standard (e.g., 2.5 G, 5 G, 10 G, etc.) link rates, as well as future link rates (e.g., 40 G, 100 G, etc.). The link can also be supported by various port types (e.g., backplane, twisted pair, optical, etc.) and in various applications (e.g., Broadreach Ethernet, EPON, etc.). As illustrated, link partner 110 includes physical layer device (PHY) 112, media access control (MAC) 114, and host 116, while link partner 120 includes PHY 122, MAC 124, and host 126.

In general, hosts 116 and 126 may comprise suitable logic, circuitry, and/or code that may enable operability and/or functionality of the five highest functional layers for data packets that are to be transmitted over the link. Since each layer in the OSI model provides a service to the immediately higher interfacing layer, MAC controllers 114 and 124 may provide the necessary services to hosts 116 and 126 to ensure that packets are suitably formatted and communicated to PHYs 112 and 122. MAC controllers 114 and 124 may comprise suitable logic, circuitry, and/or code that may enable handling of data link layer (Layer 2) operability and/or functionality. MAC controllers 114 and 124 can be configured to implement Ethernet protocols, such as those based on the IEEE 802.3 standard, for example. PHYs 112 and 122 can be configured to handle physical layer requirements, which include, but are not limited to, packetization, data transfer and serialization/deserialization (SERDES).

During transmission, each layer may add its own header to the data passed on from the interfacing layer above it. During reception, a compatible device having a similar OSI stack may strip off the headers as the message passes from the lower layers up to the higher layers.

In general, controlling the data rate of the link may enable link partners 110 and 120 to communicate in a more energy efficient manner. More specifically, a reduction in link rate to a sub-rate of the main rate enables a reduction in power, thereby leading to energy savings. In one example, this subrate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate. For example, a subset 1 G PHY can be created from a parent 10 GBASE-T PHY by a process that turns off three of the four channels. In another embodiment, the subset PHY technique is enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10 G enhanced core can be transitioned down to a 1 G link rate when idle, and sped back up to a 10 G link rate when data is to be transmitted.

Another example of subrating is through the use of a low power idle (LPI) technique. In general, LPI relies on turning the active channel silent when there is nothing to transmit. Energy is thereby saved when the link is off. Refresh signals can be sent periodically to enable wake up from the sleep mode. In one embodiment, a sync signal can be used on the interfaces (i.e., medium dependent interface (MDI) and PHY/medium access control (MAC) interface) to allow for a quick wake up from the sleep mode and maintain frequency lock. For example, on the MDI interface for a 10 GBASE-T signal, a simple PAM2 pseudorandom bit sequence could be used on pair A during LPI mode. This would not significantly increase the power that is consumed.

In general, both the subset and LPI techniques involve turning off or otherwise modifying portions of the PHY during a period of low link utilization. As in the PHY, power savings in the higher layers (e.g., MAC) can also be achieved by using various forms of subrating as well.

As FIG. 1 further illustrates, link partners 110 and 120 also include EEE control policy entities 118 and 128, respectively. In general, EEE control policy entities 118 and 128 can be designed to determine when to enter an energy saving state, what energy saving state (i.e., level of energy savings) to enter, how long to remain in that energy saving state, what energy saving state to transition to out of the previous energy saving state, etc.

In general, EEE control policy entities 118 and 128 can comprise suitable logic, circuitry, and/or code that may be enabled to establish and/or implement an EEE control policy for the network in which the link resides. In various embodiments, EEE control policy entities 118 and 128 can be a logical and/or functional block which may, for example, be implemented in one or more layers, including portions of the PHY or enhanced PHY, MAC, switch, controller, or other subsystems in the host.

EEE control policy entities 118 and 128 can be enabled to analyze traffic on the physical link and to analyze operations and/or processing of data in link partners 110 and 120. In this manner, EEE control policy entities 118 and 128 may exchange information from, or pertaining to, one or more layers of the OSI hierarchy in order to establish and/or implement the EEE control policy.

As noted, conventional EEE control policies are designed to base their decisions on a combination of static settings established by an IT manager and the properties of the traffic bandwidth on the link itself. These considerations are limited.

For example, conventional EEE control policies cannot consider the nature of the traffic content or the user/device that originated the traffic. To illustrate this deficiency, consider a scenario where a first user has working hours that are shifted late in the evening and that requires a high bandwidth link to run a computer aided design (CAD) tool, while a second user has working hours that are shifted early in the morning and that requires a low bandwidth link to work on a presentation. As this scenario illustrates, the first and second users' schedules and bandwidth needs are distinctly different, and would therefore require vastly different considerations when applying an EEE control policy. Conventional EEE control policies would be unable to distinguish between the two types of traffic as well as the disparate time-of-day usage.

Figure 2:
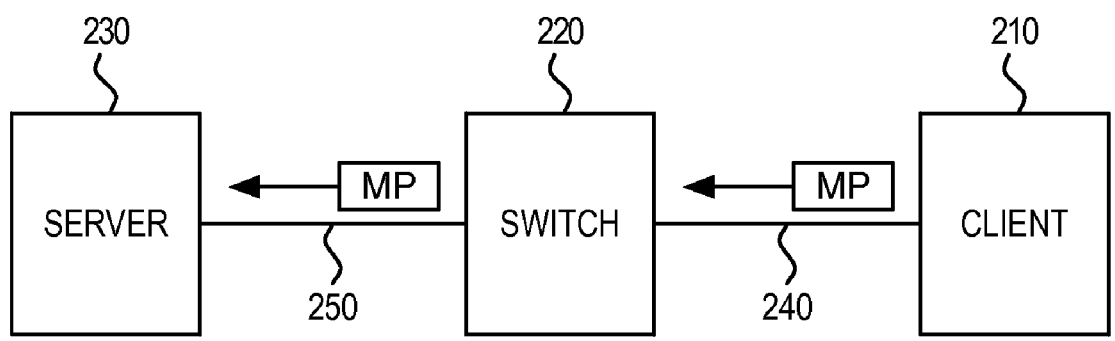
FIG. 2 illustrates an example mechanism of propagating energy saving classification information.

It is therefore a feature of the present invention that an EEE control policy can be designed to identify energy savings based on dynamic considerations. FIG. 2 illustrates one embodiment by which dynamic elements can be considered by an EEE control policy. As illustrated, client 210 is connected to server 230 via switch 220. In this simple network example, client 210 is designed to send packet data on link 240 to switch 220, which forwards the received packet data to server 230 via link 250.

In a conventional system, the EEE control policy would determine the potential energy savings on links 240 and 250 based on the frequency and amount of traffic on the link itself. While this analysis can be further augmented with static settings (e.g., time-of-day considerations) established by the IT manager, the analysis would not depend on the content of the traffic itself, nor the identity of the user/device that originated it. Additionally, the EEE control policy traffic analysis would be independently performed for links 240 and 250. This process can lead to non-optimal energy saving states that either fail to achieve maximum power savings when available or fail to maintain maximum link performance when needed.

In the present invention, profile information is propagated across the link(s) and used to enhance the ability of the EEE control policy to maximize energy savings without an undue impact on performance. In the example of FIG. 2, profile information is disseminated using marked packets (MPs) that traverse links 240 and 250. While the specific marking mechanism for the MPs is implementation dependent, the design of such marking is to provide energy saving profile information that can be used by the EEE control policy.

In one example, the profile information represents a multi-bit field in a packet header that indicates an EEE classification. The particular definition of the range of EEE classifications would be implementation dependent. One particular design can designate a range of EEE classifications that indicate a relative tradeoff of energy priority. Here, the highest classification can represent the lowest-priority traffic that can be most readily sacrificed for energy savings, while the lowest classification can represent the highest-priority traffic that must be preserved at the expense of energy savings. Upon receipt by a link partner, the propagated EEE classification information can be used by the EEE control policy as one of the variables in its EEE determination. As would be appreciated, the particular weighting of the propagated EEE classification information relative to static settings and traffic analysis would be implementation dependent. For example, in a strong weighting, a designation of a lowest EEE classification can prevent the EEE control policy from directing a transition to an energy saving state even when the traffic utilization analysis indicated that an energy saving state should be entered. In another example, a type of traffic (e.g., identified by one or more fields in a packet header) can be mapped to an EEE classification. In one embodiment, the mapping can be based on an EEE profile for a user/device where a resource profile that considers attributes such as time of day, user ID, MAC ID, application, etc. is used to implement an EEE control policy.

The propagation of EEE profile information is designed to provide an additional variable for consideration by the EEE control policy. As the EEE profile information can relate to the content of the traffic, the user, the device, etc., the EEE profile information provides a dynamic element to the EEE control policy analysis.

In one embodiment, the profile information can be generated based on an identity of the user. For example, an engineering or management user may have an EEE classification that places a premium on performance, while an administrative user may have an EEE classification that places a premium on energy savings. In another embodiment, the profile information can be generated based on an identity of the device. For example, a laptop assigned to an engineering lab, a VOIP phone dedicated to 911 calls, or a particular switch may have an EEE classification that places a premium on performance, while a kiosk at a reception area may have an EEE classification that places a premium on energy savings. In another embodiment, the profile information can be generated based on application information. For example, a CAD or hardware design application running on the computing device may have an EEE classification that places a premium on performance, while an office productivity application (e.g., presentation software) may have an EEE classification that places a premium on energy savings. In another example, the profile information is based not only on the identity of the application but also on the data contained therein. Here, calendar/scheduling information (e.g., MICROSOFT OUTLOOK™) can be accessed, either locally or remotely, to determine an EEE classification. In one scenario, scheduled times designated as work versus home hours can be used to drive the EEE classification. In another scenario, the identification of a place of log-in (e.g., home versus work) can be used to drive the EEE classification. In general, any application information that is relevant to potential energy savings can be used to generate EEE profile information.

In one embodiment, a software application running on the device can be used to generate the profile information. This software application (e.g., applet) can be downloaded from the network and designed to track a set of one or more parameters that exist either locally and/or remotely. The particular set of parameters that are monitored would be implementation dependent.

Figure 3:
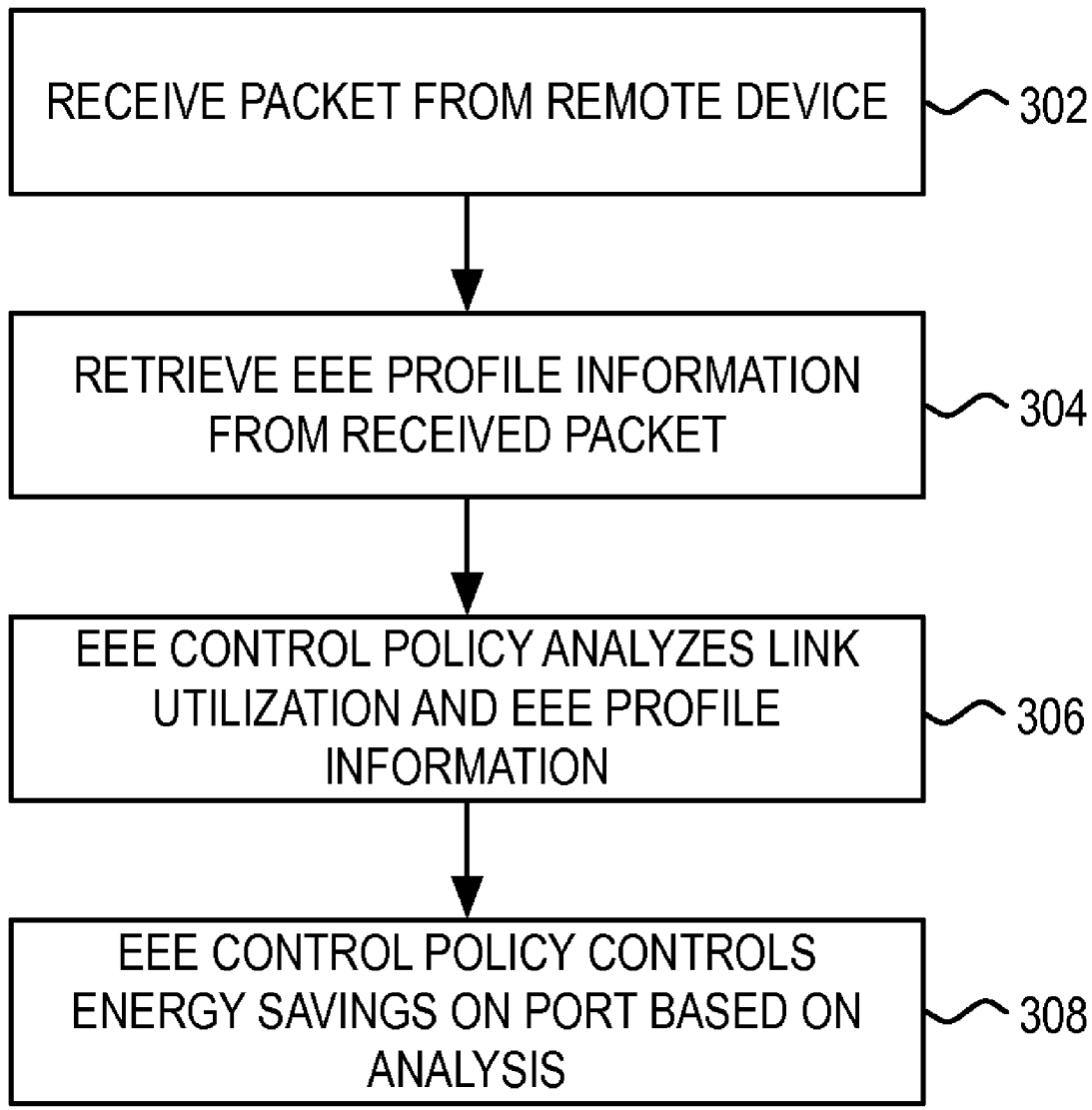
FIG. 3 illustrates a flowchart of a process of controlling energy savings based on propagated energy saving classification information.

To further illustrate the propagation of profile information, reference is now made to the flowchart of FIG. 3. As illustrated, the process begins at step 302 where a packet is received from a remote device. As would be appreciated, reception of the packet can occur at any point in the network. For example, as illustrated in FIG. 2, an MP can be received at switch 220, or further down the line at server 230. Next, at step 304, the receiving device retrieves the EEE profile information from the received packet. In one embodiment, the retrieved EEE profile information is a multi-bit field in a header of the packet. This multi-bit field can be a defined EEE classification that denotes a particular EEE priority level useful to the EEE control policy.

At step 306, the EEE control policy then analyzes the link utilization in combination with the EEE profile information. As noted, the EEE control policy can also consider static settings that have been established by the IT manager. The propagation of the EEE profile information provides the EEE control policy with additional control variables that provides an additional level of analysis in understanding the potential implications of transitioning to an energy saving state. This additional control variable has the potential to offset an energy saving indication produced by the traffic analysis alone. Based on the analysis of step 306, the EEE control policy can then control, at step 308, the energy savings for the port on which the EEE profile information was received by identifying the particular energy saving state that is utilized. As would be appreciated, multiple energy saving states can be defined to account for different performance levels. Here, a deep energy saving state would have greater performance impact due to the longer wake-up time needed to transition the port back to an active state where packets can be processed.

In general, the decisions produced by consideration of EEE profile information enables the EEE control policy to generate better decisions that account for the real impact of entering into an energy saving state. Moreover, the propagation of the EEE profile information enables the EEE control policy to examiner energy savings from an end-to-end network perspective, not from the perspective of a particular link in isolation. As noted, the principles of the present invention enable the customization of an EEE control policy to individual ports of a network element. This enables the overall EEE control policy for an aggregated element (e.g., switch) to be optimized. Yet another advantage of the present invention is that it enables dynamic movement of a user/device throughout a particular network wherein the user/device would not experience different end-to-end performance in the network due to varying EEE control policies. The end-to-end user/device experience of performance would thereby be preserved while also accommodating the enterprise goal of energy savings.

Figure 4:
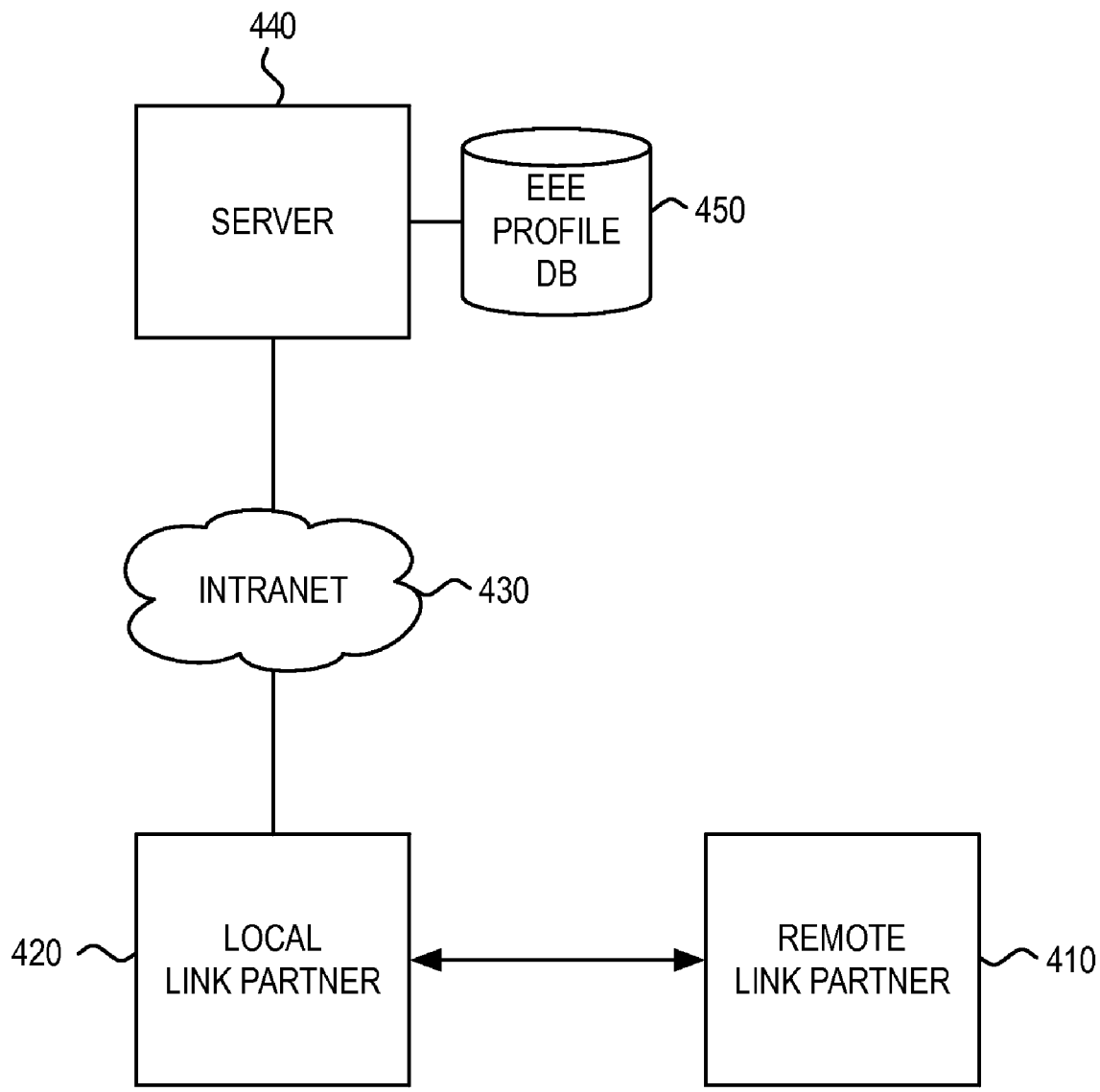
FIG. 4 illustrates an example of retrieving energy profile information via a network.

FIG. 4 illustrates another embodiment by which dynamic considerations can be considered by an EEE control policy. In this embodiment, EEE profile information is not propagated across the link, but rather retrieved from a network database. As illustrated, local link partner 420 is in communication with remote link partner 410 over a link. In one example, local link partner 420 can represent a switch, which supports a plurality of link partners. As would be appreciated, the link can be part of LAN, MAN, WAN, wholly managed private network (e.g., VPN), etc.

In operation, the EEE control policy of local link partner 420 can access EEE profile database 450 via server 440, which is linked to local link partner 420 via intranet 430. As would be appreciated, the contents of EEE profile database 450 need not be centralized, but can be cached or otherwise distributed across different parts of the network.

The access of EEE profile database 450 by EEE control policy can be based on identifying information that is associated with a user/device represented by itself or remote link partner 410. For example, the access of EEE profile database 450 can be based on a user identifier, MAC address, or any other identifying information. Through the access of EEE profile database 450, the EEE control policy associated with local link partner 420 can retrieve EEE profile information that can be used to determine energy savings for a particular port.

Figure 5:
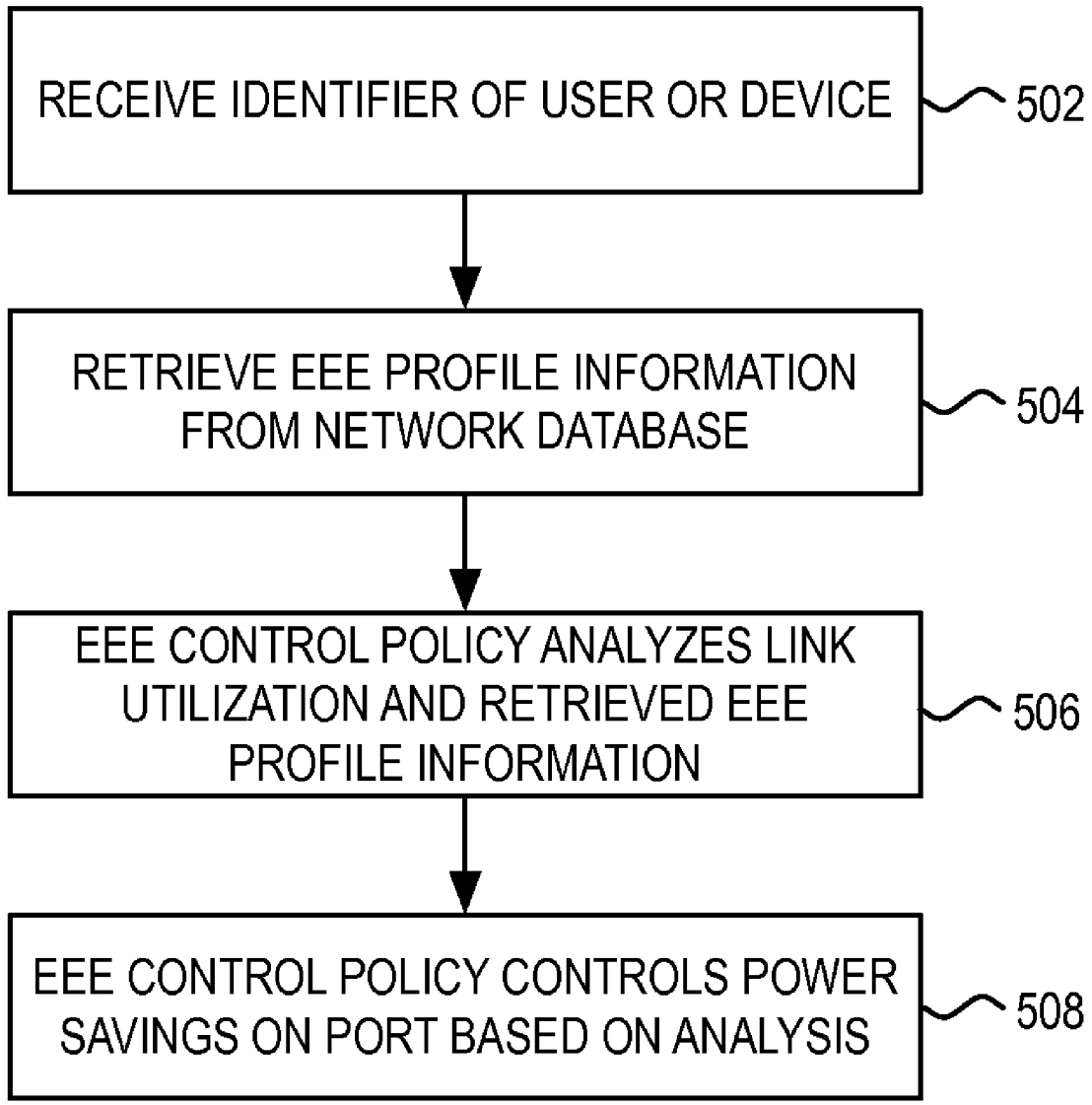
FIG. 5 illustrates a flowchart of a process of controlling energy savings based on retrieved profile information.

To illustrate this aspect of the present invention, reference is now made to the flowchart of FIG. 5. As illustrated, the process of FIG. 5 begins at step 502 where local link partner 420 receives an identifier of a user or device. In one example, this received identifier can be a user identifier. In another example, this received identifier can be a MAC address.

At step 504, local link partner 420 then retrieves an EEE profile for the user and/or device from EEE profile database 450. Access to EEE profile database 450 is based on the received identifier. In various embodiments, the EEE profile database access can be facilitated by a Layer 2 or Layer 3 mechanism.

The retrieved EEE profile information can include various user-related or device-related information. For example, the EEE profile information can include user/device information such as a user/device priority level, a user/device position, user/device preferences, user/device authorizations, user/device schedules, etc. One advantage of storing user information in an EEE network profile rather than the device itself is the portability of the user information across the network. For example, the user information (e.g., user priority level) in the network profile can be used in an EEE control policy determination whether or not the user is using his assigned computing device or borrowing another individual's computing device.

After the EEE profile information is retrieved EEE profile database 450, the EEE control policy can then analyze the link utilization in combination with the EEE profile information at step 506. As noted above, the EEE control policy can also consider static settings that have been established by the IT manager. Based on the analysis of step 506, the EEE control policy can then control, at step 508, the energy savings for the port associated with the received identifier. As would be appreciated, multiple energy saving states can be defined to account for different performance levels.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An energy efficient Ethernet method, comprising:
   receiving, from a link partner on a port, an identifier of a device;
   retrieving energy saving profile information for said device from a database using said received identifier, wherein said retrieving comprises retrieving work schedule information for said device;
   analyzing link utilization information for said link in combination with said retrieved energy saving profile information; and
   switching elements of said port into a power saving state based on a result of said analysis.

2. The method of claim 1, wherein said receiving comprises receiving a MAC address.

3. The method of claim 1, wherein said retrieving comprises retrieving a priority level for said device.

4. An energy efficient Ethernet method, comprising:
   receiving a packet from a link partner;
   retrieving energy saving classification information from said packet, wherein said energy saving classification information is based on work schedule information for a device that originated said packet;
   analyzing, by an energy efficiency control policy, link utilization information for said link in combination with said retrieved energy saving classification information to produce an energy efficiency control signal; and
   switching elements of a port interfaced with said link partner into a power saving state based on said energy efficiency control signal.

5. The system of claim 4, wherein said retrieving comprises retrieving from a header of said packet.

6. The system of claim 4, wherein said retrieving comprises retrieving an indicator that enables identification of a high performance/low energy saving classification and a low performance/high energy saving classification.

7. An energy efficient Ethernet method in an Ethernet device, comprising:
   receiving, via a packet on a port, information that enables identification of an energy saving classification of a user or device, wherein said energy saving classification information is based on work schedule information for a user or device that is associated with an origination of said packet; and
   determining, by an energy efficiency control policy, whether a port that supports communication associated with said user or device should enter into a power saving state, wherein said determination by said energy efficiency control policy is based on an analysis of link utilization information and said energy saving classification for said user or device.

8. The method of claim 7, wherein said receiving comprises receiving via a header of said packet.

9. The method of claim 8, wherein said receiving comprises receiving via an energy saving classification in said header of said packet.

10. The method of claim 7, further comprising transitioning said port to said power saving state upon said determination.

11. The method of claim 7, further comprising mapping said received information to an energy saving classification.

* * * * *